A. F. WALTHER.
TUNNELING MACHINE.
APPLICATION FILED MAY 22, 1911.

1,026,335.

Patented May 14, 1912.

5 SHEETS—SHEET 1.

Witnesses
H. A. Stock
E. W. Caly

Inventor
A. Fred Walther
By E. E. Vrooman,
Attorney.

A. F. WALTHER.
TUNNELING MACHINE.
APPLICATION FILED MAY 22, 1911.

1,026,335.

Patented May 14, 1912.
5 SHEETS—SHEET 3.

Witnesses
H. A. Stock.
E. W. Cady.

Inventor
A. Fred Walther

Attorney.

COLUMBIA PLANOGRAPH CO., WASHINGTON, D. C.

A. F. WALTHER.
TUNNELING MACHINE.
APPLICATION FILED MAY 22, 1911.

1,026,335.

Patented May 14, 1912.
5 SHEETS—SHEET 4.

Witnesses
H. A. Stock.
E. W. Cady

Inventor
A Fred Walther
By E. E. Vrooman,
Attorney.

COLUMBIA PLANOGRAPH CO., WASHINGTON, D. C.

A. F. WALTHER.
TUNNELING MACHINE.
APPLICATION FILED MAY 22, 1911.
1,026,335.
Patented May 14, 1912.
5 SHEETS—SHEET 5.
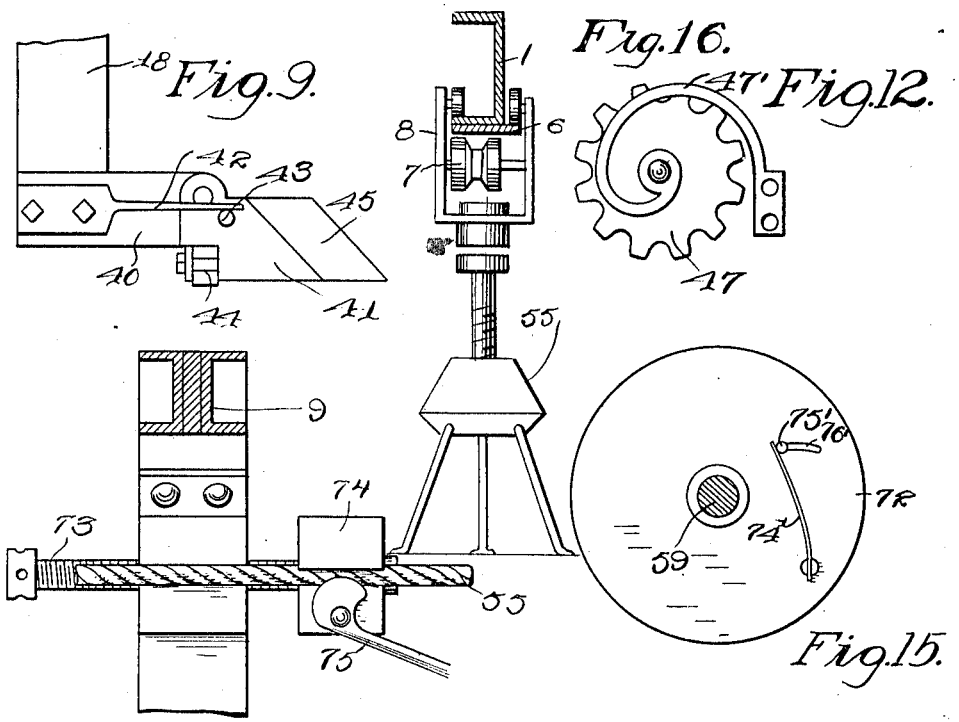
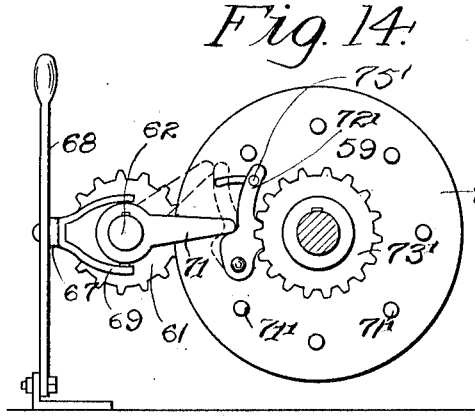
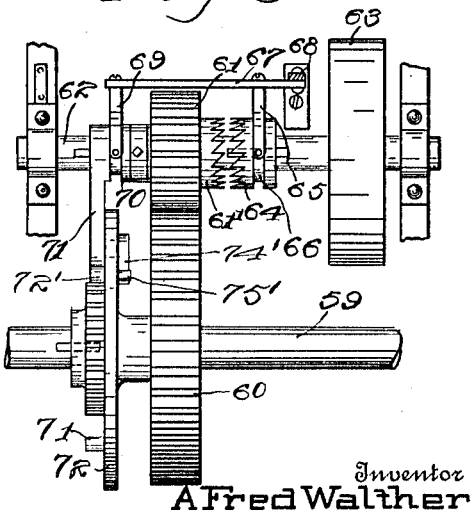
Inventor
A Fred Walther

UNITED STATES PATENT OFFICE.

ADOLPH FRED WALTHER, OF OAKLAND, CALIFORNIA.

TUNNELING-MACHINE.

1,026,335.  Specification of Letters Patent.  Patented May 14, 1912.

Application filed May 22, 1911. Serial No. 628,706.

*To all whom it may concern:*

Be it known that I, ADOLPH FRED WALTHER, a citizen of the United States, residing at Oakland, in the county of Alameda and State of California, have invented certain new and useful Improvements in Tunneling-Machines, of which the following is a specification.

This invention relates to machines for boring tunnels and has especial reference to that class of tunneling machines in which a frame work is provided for supporting the tunnel as it is bored out in which is mounted a boring mechanism and means for feeding the same forward as the boring advances.

The invention has for its object to provide an improved boring apparatus of this kind by means of which a tunnel may be effectively bored out and as the boring advances the frame work supporting the bored out tunnel may be readily brought forward with little labor.

The invention further has for its object to provide an improved tunneling apparatus by means of which not only can a tunnel be bored out but also cut so as to form a level floor on its bottom.

Figure 1:
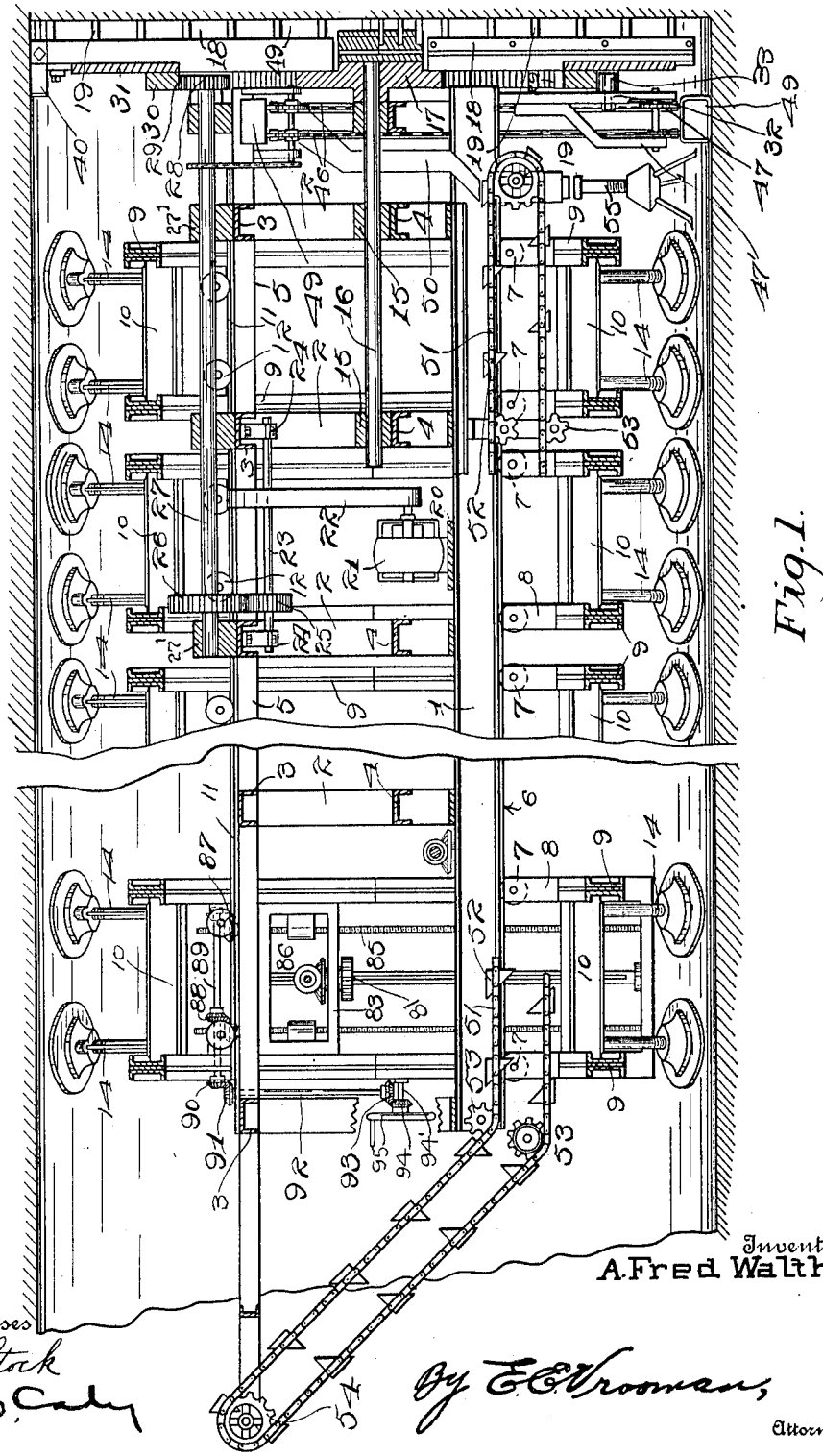
Figure 2:
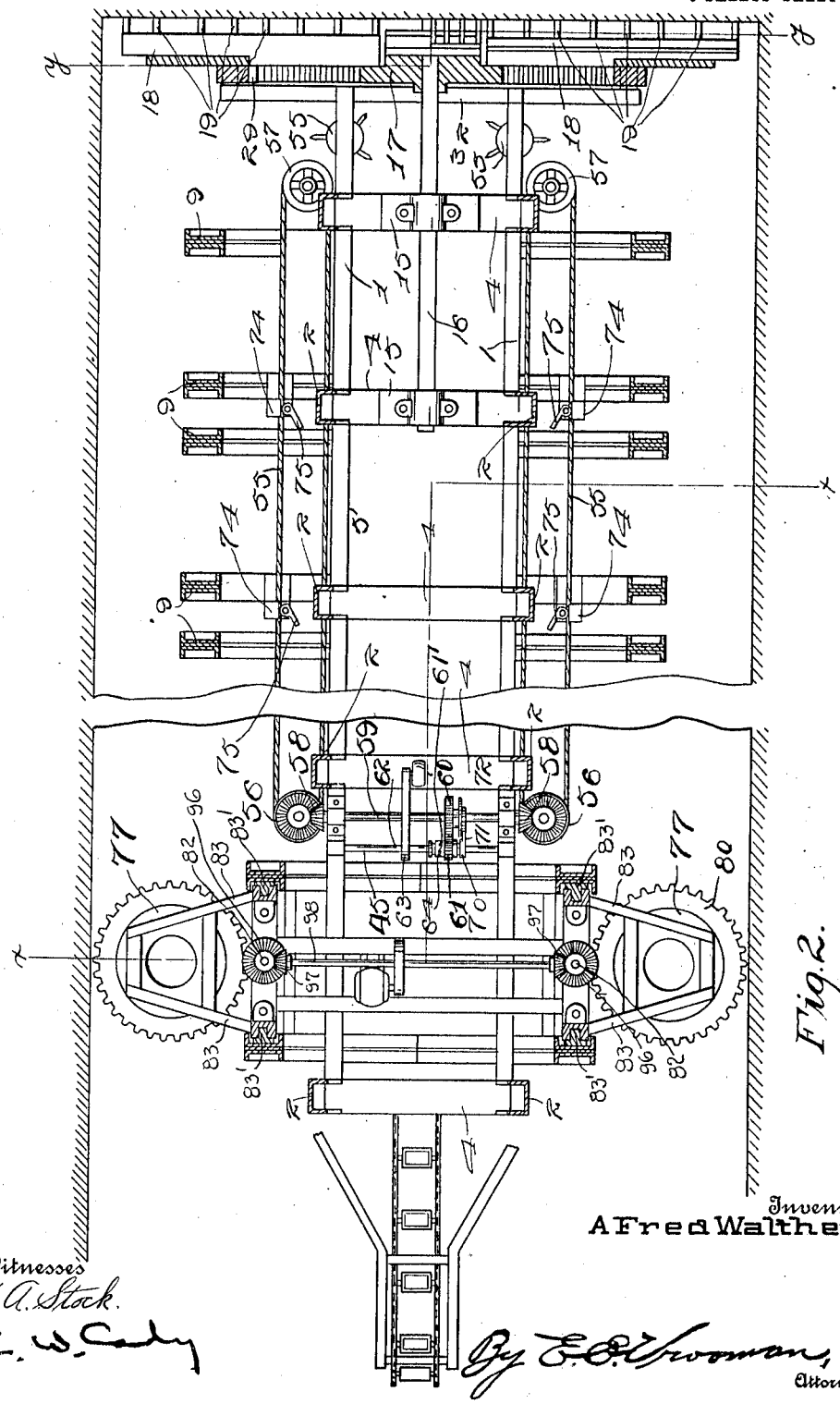
Figure 3:
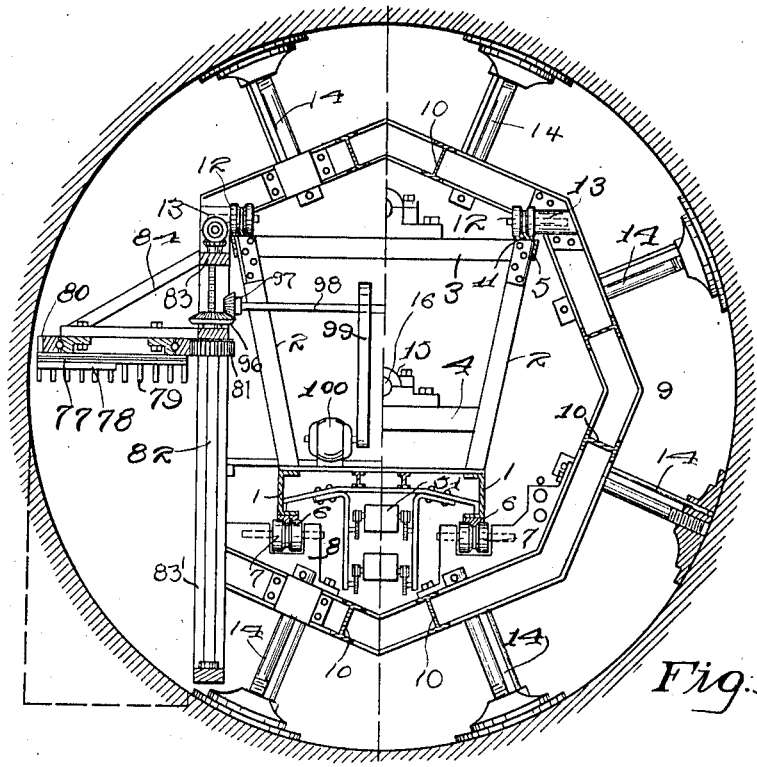
Figure 4:
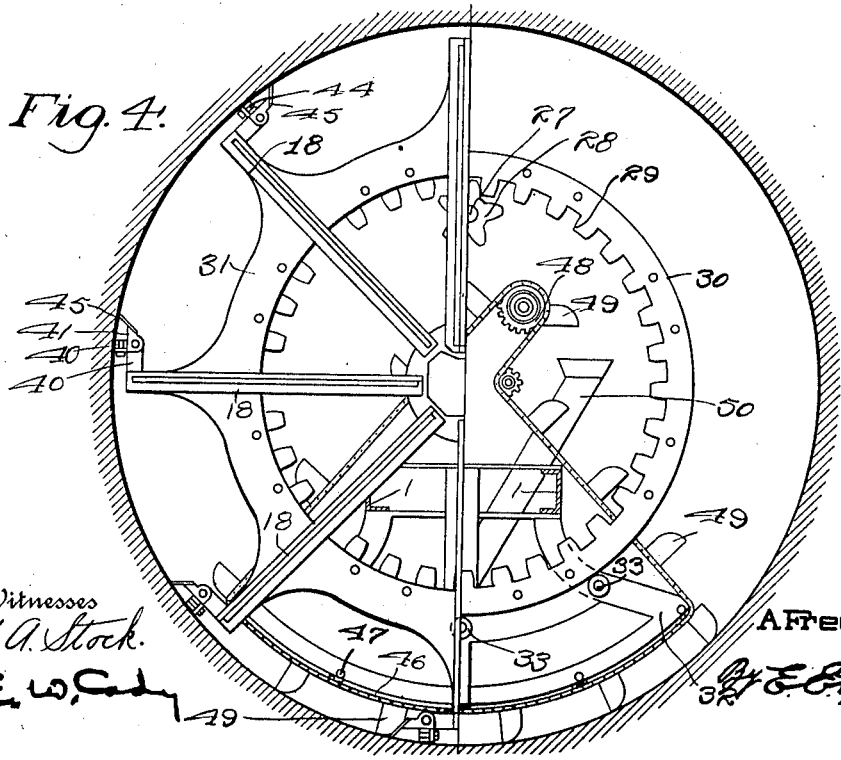
Figure 5:
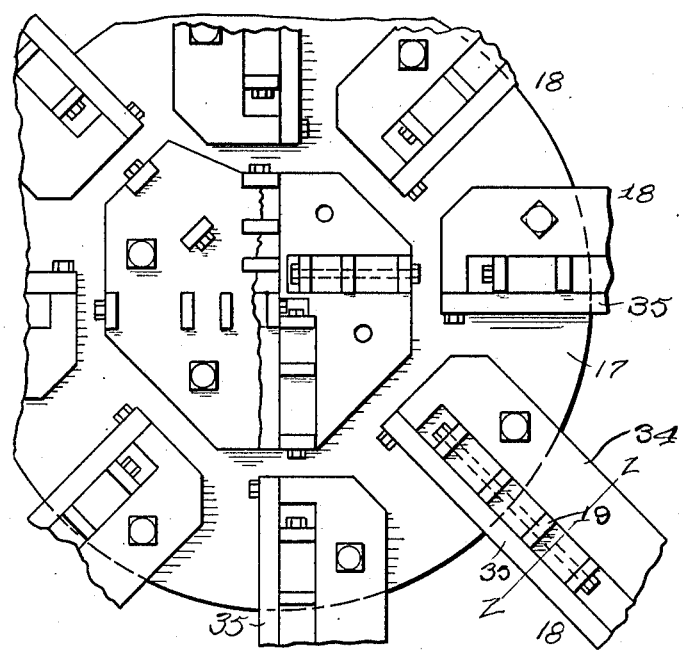
Figure 6:
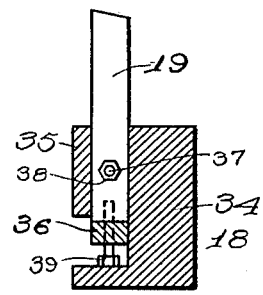
Figure 7:
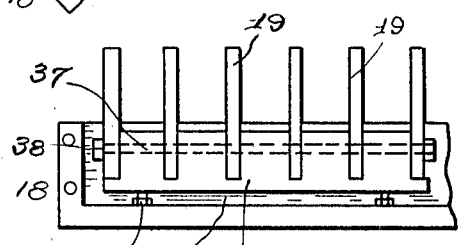
Figure 8:
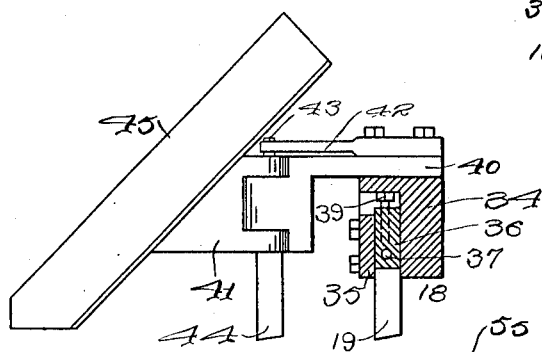
Figure 10:
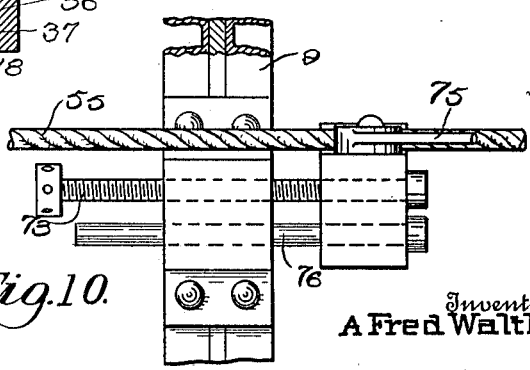

Referring to the accompanying drawings:—Figure 1 is a longitudinal vertical section of a tunneling apparatus constructed in accordance with this invention and shown in operative position with a portion of a tunnel bored out. Fig. 2 is a view of the boring apparatus constructed in accordance with this invention in horizontal longitudinal section. Fig. 3 is a vertical cross section on the line X—X, Fig. 2. Fig. 4 is a cross section on the line Y—Y, Fig. 2. Fig. 5 is a detail view of the cutting head with a portion of the cutter supporting arms shown as broken away. Fig. 6 is a detail view in cross section on the line Z—Z, Fig. 5, of one of the cutter arms and a cutter. Fig. 7 is a detail view of a portion of a cutter arm showing cutters with the clamping bar removed. Fig. 8 is a detail plan view of the end of a cutter arm showing a cutter and scraper. Fig. 9 is a rear view of the device shown in Fig. 8. Fig. 10 is a detail view of a portion of one of the movable supporting frames, a portion of the feed cable and a clamping device connected therewith. Fig. 11 is a plan view of the device shown in Fig. 10. Fig. 12 is an enlarged detail view of one of the wheels employed with an elevator. Fig. 13 is a plan view of a portion of the feed mechanism. Fig. 14 is an end view of the device shown in Fig. 13. Fig. 15 is a detail view of a portion of the mechanism shown in Fig. 14. Fig. 16 is a detail view of a supporting jack employed with the removable frame.

The boring apparatus comprising this invention is constructed and arranged as follows:—The longitudinal movable frame for supporting the boring mechanism consists of a pair of longitudinal channel bars 1 spaced apart from each other and having mounted thereon suitable frame work consisting of the inclined uprights 2, in the shape of channel irons, connected at the top by cross channel bars 3 and adjacent to the bottom by cross bars 4 and connected longitudinally by means of angle irons 5. The frame so constructed with the channel bars 1 is movable longitudinally, the bottom of each of the channel bars 1 being formed with a longitudinal track 6 which rests upon grooved rollers 7 mounted in brackets 8 on pairs of octagon shaped frames 9 formed of channel bars, said pairs of octagon frames 9 being spaced from each other and connected together by longitudinal I-bars 10. The top of the frame formed by the bars 2 and the cross bars 3 and 4 is provided with longitudinal tracks 11 on which rest grooved rollers 12 mounted in bearings 13 on the octagon frames 9. The octagon frames 9 are provided with jacks 14 by means of which the frames 9 are supported and also the walls of the bored out tunnel are braced.

Mounted in bearings 15 on the cross bars 4 of the longitudinally movable frame, as more particularly shown in Fig. 1, is a central shaft 16 on the outer end of which is mounted a disk 17 to which is secured in any suitable manner radial arms 18 on which the cutters 19 are mounted.

Mounted on a transverse plate 20 secured to the longitudinal beams 1 is a motor 21, which is connected by an endless belt 22 passing over a pulley on the shaft of the motor with a pulley on the shaft 23, supported in bearings 24 in the frame work of the apparatus and having mounted thereon a toothed wheel 25 which meshes with a toothed wheel 26 on a shaft 27 mounted in suitable bearings 27' in the frame work and having at its outer end a pinion 28 which meshes with the teeth 29 of a ring 30. The ring 30 is mounted on the plate 31 on which are mounted the cutter arms 18, as more particularly shown in Fig. 4.

Mounted on the forward ends of the channel bars 1 is a frame 32 having bearing rollers 33 on which the ring 30 bears, thereby serving to support the weight of the cutting head. The cutter supporting arms 18 are each formed of an L-shaped bar 34 to which is clamped a bar 35 serving to hold a number of seats 36 in place, each of said seats containing a number of cutters 19 which are held in the seat by means of a transverse rod 37 provided at each end with a nut 38 whereby the cutters 19 are held in the seat. To facilitate sharpening the cutters they are mounted in a number of seats as described so that they may be readily removed. Each of the seats 36 is mounted on set screws 39, whereby the seats may be adjusted so that the distance from the cutting edge of the cutters to the back of the set screws may be accurately gaged thus permitting the cutters to be sharpened and readily placed in position with the least possible delay. It is contemplated that the cutters of each arm will cut a path concentric with the cutters in the previous arm but having a radius larger according to the width of the cutters, this arrangement being followed throughout all the arms.

On the outer end of each arm 18 is bolted a bracket 40 to which is hinged a plate 41 as shown in Fig. 8 yieldingly held in place by a spring 42 bearing against a pin 43 on the hinged plate 41. Clamped to the hinged plate 41 are cutters 44 each following the same path in the rotation of the cutters and each cutting the outer bore of the tunnel. A scraper 45 is also mounted on the hinged plate 41, as shown in Figs. 4 and 8 and serves to push the debris back from the cutting face so that the debris may be picked up by an elevator. The elevator consists of endless chains 46 which pass over idler sprocket wheels 47 mounted on spring arms 47', as shown in Fig. 12, and over idler sprocket wheels 48 in elevated position and upon the endless chains 46 are mounted buckets 49 which as they pass over the idler sprocket wheels 48 are tilted to dump the contents into the upper end of an inclined chute 50 through which the debris is carried to the horizontal conveyer shown in Fig. 1 consisting of endless chains 51 having buckets 52 in which the debris from the chute 51 is carried to the rear end of the machine and up an incline at the lower end of which are located toothed wheels 53 over which the endless chains 51 pass up to at an incline and over toothed wheels 54 located in a position to dump the contents of the buckets 52 into a suitable receptacle located beneath the same.

As the boring advances it becomes necessary to move forward the supporting frames and jacks and this is done by moving forward pairs of octagon frames 9, the jacks connected therewith being released from their clamped position.

In order to support the forward end of the inner frame jacks 55 are provided as shown in Figs. 1 and 16, the jacks 55 being brought into use to support the forward ends of the channel bars 1 while the octagon frames 9 are moved forward into position successively. It will be noted that in this movement of the octagon frames 9 that when they are released from the jacks 14 they can be moved forward on the inner frame by means of the rollers 7 and 12 on the tracks 6 and 11.

The frames are brought forward by the feeding mechanism shown in Figs. 11, 13 and 14 which consists of cables 55 located on each side of the central frame, each of said cables being given a number of turns on a drum 56, each of said drums 56 being geared to a bevel gear wheel 58 on the end of a shaft 59 mounted in the main frame. The shaft 59 has mounted thereon a gear wheel 60 which meshes with a toothed wheel 61 loosely mounted on the shaft 62, as shown in Figs. 2 and 13, said shaft 62 being driven by a band wheel 63 mounted thereon which may be connected by a belt with a suitable motor. The toothed wheel 61 loosely mounted on the shaft 62 is provided with a clutch collar 61' adapted to be engaged by a clutch 64 splined to the shaft 62 and movable into and out of engagement with the clutch collar 61' by means of a fork 65 engaging a grooved collar 66 of the clutch 64. The fork 65 is mounted on a rod 67 pivoted at one end to a lever handle 68, as shown in Fig. 14, and at its other end to a fork 69 engaging a collar 70 splined to the shaft 62 and slidable thereon, said collar 70 having an arm 71 overlapping a disk 72 mounted on the shaft 59, the arm 71 as the shaft 62 rotates coming in contact with the pins 71' on the disk 72. The disk 72 rotates on the shaft 59 and has mounted upon it the pawl 72' which normally is held disengaged from the toothed wheel 73' by a spring 74' on the disk 72, the spring 74' bearing against the pin 75' mounted on the pawl 72' on the disk 72.

The cables 55 are secured to the octagon frames 9, as shown in Figs. 10 and 11 by means of a screw 73 mounted on the frame 9, said screw having mounted thereon a block 74 on which is mounted a cam lever 75 which bears against the cable 55 and clamps it to the block 74. The block 74 is prevented from rotation by means of a pin 76 extending through the octagon frame 9. It will be seen that the sections 9 may be attached to and detached from the cables 55 by means of the clamping devices described.

To provide a level bottom or floor for the tunnel, the tunnel is cut out as shown in dotted lines in Fig. 3, by the following mechanism:—Small horizontal heads 77 are provided carrying a number of cutter bars 78, with cutters 79, similar to and similarly mounted and arranged in accordance with the arrangement of the bars and cutters at the forward end of the machine, the revoluble heads 77 and the driving mechanism connected therewith being mounted upon a suitable frame work which may be clamped by jacks against the top and bottom of the tunnel.

The cutter bars and the revoluble heads are mounted on the sprocket wheel 80 driven by the pinion 81 which is slidable longitudinally over the shaft 82. A frame 83 is movable in suitable vertical guides 83', shown in Fig. 1, and to the frame 83 is attached a bracket 84 supporting the rotating portions of the cutter head. Vertical threaded rods 85 pass through brackets 86 on the sides of the frame 83 and are operated by a beveled gear wheel 87 at the upper end of each rod 85 which meshes with a beveled gear wheel 88 on a shaft 89 having on its outer end a beveled gear wheel 90. The beveled gear wheel 90 meshes with a beveled gear wheel 91 on one end of a shaft 92 the other end of said shaft having a beveled gear wheel 93 which meshes with a beveled gear wheel 94 on a shaft 94'. Mounted on the shaft 94' is a hand wheel 95 by means of which the threaded rods 85 are rotated. The shaft 82 is driven by means of a bevel gear wheel 96 on its upper end meshing with a beveled gear wheel 97 on the end of a shaft 98 on which is mounted a pulley over which extends an endless band 99 engaging a pulley on the shaft of a motor 100.

The operation of the apparatus is as follows:—The cutters 19 on the bars 18 are operated so as to cut circumferential grooves in the adjacent face of the material out of which the tunnel is to be bored, the cutters at the outer ends of the bars 18 cutting the outer bore of the tunnel. The operation of the parts is carried on by power transmitted from the motor 21 through the intervening mechanism to the revoluble head on which the cutter bars are mounted. As the cutting takes place the frame on the longitudinal channel bars 1 together with the latter are fed forward by the action of the cables 55 and the drums 56, the pairs of octagon frames 9 being held firmly in place by means of the jacks 14. The feed mechanism operates so as to cause the frame carrying the boring mechanism to advance step by step. The shaft 62 is continually revolving with the arm 71 and at each revolution thereof the arm 71 makes contact with a pin 71' thereby rotating the disk 72 through a given distance. When a certain point is reached the arm 71 contacts with the pawl 72', as shown in dotted lines in Fig. 14, pushing the tooth of the pawl into engagement with the toothed wheel 73'. Then as the arm 71 rotates the gear 73' the shaft 59 is geared with it until the arm 71 passes out of contact with the pawl 72' thereby turning the shaft 59, and the drum 56 and advancing the whole frame a given distance. When it is desired to pull the cutter head back for repairs or to run it into position quickly, the clutch 64 is brought into engagement with the clutch collar 61' thereby fastening the toothed wheels 61 to the shaft 62 and at the same time through the arm 67 and the fork 69 moving the arm 71 so that it cannot contact with either the pins 71' or the pawl 72'. By means of a cross belt or by reversing the motor the cutter head may be moved either in or out.

When the cutting has advanced a given distance the jacks 55 are brought into use to support the inner ends of the channel bars 1 and the jacks 14 on the forward pair of octagon frames 9 are loosened and the clamps on the cable released from said frames. The released pair of octagon frames is then moved forward as far as required and then again clamped in position by means of the jacks 14. When this is done it will be found that the cables between this advanced section and the next one are not in tension. To secure this tension and make each pair of octagon frames forming a section take up an equal part of the pull of the cables 55, the screw 73 is turned to draw the block 74 toward the octagon frame 9 until the desired tension is secured. The horizontal movable cutters at the side of the apparatus are movable vertically midway between the top and bottom of the tunnel to the bottom of the tunnel thus providing a level flooring for the bottom of the tunnel as indicated by the dotted lines in Fig. 3.

What I claim is:—

1. A tunneling apparatus comprising a plurality of main frames, detachable braced supports for holding said frames in a tunnel, a frame movable longitudinally in said plurality of frames, a rotary shaft and head mounted in said frame, radial bars provided with cutters mounted on said rotary head, and mechanism for operating said rotary head and cutter bars.

2. A tunneling apparatus comprising a plurality of octagon frames connected together in pairs, jacks radially connected to said octagon frames, a frame movable longitudinally in said octagon frames, a rotary head, bars with a plurality of cutters on each bar radially mounted on said head with a cutter on the outer end of each of said bars, and mechanism for rotating said cutter head.

3. A tunneling apparatus comprising a plurality of supporting frames, each of said frames consisting of a pair of octagon shaped frames connected together, said pairs of frames being disconnected from each other, and each of said frames having supporting rollers, a longitudinal frame mounted on said supporting rollers and movable longitudinally thereon, a rotary head mounted on said longitudinal frame and having radial cutter bars, each of said bars having a plurality of cutters, and a cutter at the outer end of the bar, mechanism for operating said rotary head, and a mechanism for feeding said longitudinal frame forward.

4. A tunneling apparatus consisting of a plurality of main supporting frames movable independently of each other, jacks radially connected to said frames, said frames being provided at the top and bottom with bearing rollers, a longitudinal frame having tracks mounted on said rollers, said frame being movable longitudinally on said rollers, means for independently and successively moving said frames forward in a tunnel upon releasing the jacks, a rotary head mounted on said longitudinal frame, and having radial cutter bars with a plurality of cutters located on said bars, and a laterally projecting yielding cutter on the outer end of each of said cutter bars, and a mechanism for operating said rotary head.

5. A tunneling apparatus consisting of a plurality of independent main supporting frames each provided with bearing rollers, jacks radially mounted on said frames, a longitudinal frame movable longitudinally in said frames and having tracks at its top and bottom mounted on said bearing rollers, a central rotary shaft mounted in said longitudinal frame, a rotary head on said shaft having radial cutter bars, each provided with a plurality of cutters, and a laterally projecting yielding cutter at its outer end, a mechanism for operating said rotary head, and a mechanism for independently feeding forward said main supporting frame and consisting of drums, endless cables mounted on said drums, pulleys over which said endless cables extend, means for independently securing said supporting frames to said cable, and a mechanism for operating said cables.

6. In a tunneling apparatus of the kind described, a plurality of main supporting frames independent of each other, and having jacks radially mounted thereon, a dumping mechanism and a frame supporting said mechanism and longitudinally movable in said main supporting frames, said main supporting frames being independently movable lengthwise on said longitudinal frame when the jacks are released, a pulley located on each side of and at one end of the apparatus, a drum mounted on each side and adjacent to the other end of the apparatus, an endless cable extending lengthwise of the plurality of main supporting frames on each side thereof and passing over a pulley and a drum, mechanism for operating said drum and reversing the movement thereof, and means for detachably engaging said cables independently to said main supporting frame and taking up the slack of said cable.

7. In a tunneling apparatus of the kind described, a plurality of independent main supporting frames, jacks radially mounted on said frames, a longitudinal frame movable lengthwise in said main supporting frames, a cutting mechanism mounted on said longitudinal frame, a conduit for receiving cut material located adjacent to the cutting mechanism, means for delivering the cuttings to the conduit, an endless conveyer coöperating with said conduit and extending lengthwise of the apparatus to a point beyond its rear.

8. In a tunneling apparatus of the kind described, a plurality of main supporting frames adapted to be successively moved forward as the tunnel advances, a frame longitudinally movable in said main supporting frames, a rotary mechanism mounted on said frame and containing a plurality of radial cutter bars each having a plurality of cutters, and a vertically movable cutting mechanism adapted to form a vertical straight side of a tunnel, and a level floor.

9. In a tunneling apparatus of the kind described, a vertically movable frame, a horizontal rotary cutting mechanism mounted on said frame and located adjacent to the side of the tunnel being bored, and a mechanism connecting said movable frame with said cutting mechanism for simultaneously operating the same.

10. In a tunneling apparatus of the kind described, a plurality of main supporting frames movable to adjusted position independently of each other, a frame movable longitudinally in said main supporting frames, a rotary shaft mounted on said longitudinal frame, a rotary cutter head on the outer end of said shaft at one end of the apparatus, radial cutter bars mounted on said rotary head, each of said bars having a plurality of cutters, and a yielding cutter at its outer end, a chute on the forward end of the apparatus having its upper end adjacent to the cutters and having a lower depending open end, means for delivering the cuttings to the chute and a horizontal conveyer provided with buckets and extending lengthwise of the apparatus with its outer end extending upward and at an incline to the outer end of the apparatus, the buckets in said conveyer being movable beneath the lower end of said chute.

11. In a tunneling apparatus of the kind described, a vertical frame located at one side of the apparatus between it and the side of the tunnel being bored, a frame vertically movable in said frame, a manually operated mechanism connected with said frame for raising and lowering it, a horizontal rotary cutter mechanism mounted on said frame, and a mechanism for operating said rotary cutter mechanism.

12. In a tunneling apparatus of the kind described, a cutter bar having a number of cutters located longitudinally thereon, an arm projecting laterally from one end of said cutter bar, a cutter hinged to said arm, and a spring on said arm bearing against said cutter.

13. In a tunneling apparatus of the kind described, a cutter bar having a number of cutters located longitudinally thereon, an arm projecting laterally from one end of said cutter bar, a cutter hinged to said arm, and a spring on said arm bearing against said cutter, and a scraper bar mounted on said arm and located at an angle thereto.

14. In a tunneling apparatus of the kind described, a plurality of main supporting frames independent of each other, a longitudinal frame on each of said frames adapted to be moved, an endless cable extending on each side of said frame, a pulley and drum over which each cable extends, means for detachably connecting each of said frames with said cables, a mechanism for operating said drums consisting of a rotary shaft, means for operating said shaft, a toothed gear wheel with a clutch collar loosely mounted on said shaft, a clutch slidably mounted on said shaft adapted to engage said clutch collar, a collar slidably mounted on said shaft and having a projecting arm, a lever mechanism connected to said clutch and said collar for simultaneously operating the same, a second shaft having a toothed gear wheel meshing with said last mentioned gear wheel on the first named shaft, a disk rotatably mounted on said second shaft and having a plurality of lateral projecting pins, a pinion mounted on said shaft adjacent to said disk, a pawl pivoted to said disk and connecting said pinion, a curved slot in said disk, a pin projecting from said pawl to said slot, and a spring on said disk bearing against said pin, said arm projecting from the collar on the first named shaft bearing against said pawl.

In testimony whereof I affix my signature in presence of two witnesses.

A. FRED WALTHER.

Witnesses:
HELEN L. KELLY,
F. P. SCHROEDER.